United States Patent
Baker et al.

(10) Patent No.: US 7,953,033 B2
(45) Date of Patent: May 31, 2011

(54) METHOD OF SIGNALLING, A COMMUNICATION SYSTEM AND A COMMUNICATION EQUIPMENT

(75) Inventors: Matthew P. J. Baker, Canterbury (GB); Timothy J. Moulsley, Caterham (GB); Olivier J-M. Hus, Redhill (GB); Paul Bucknell, Brighton (GB); Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 415 days.

(21) Appl. No.: 10/584,956

(22) PCT Filed: Jan. 7, 2005

(86) PCT No.: PCT/IB2005/050088
§ 371 (c)(1),
(2), (4) Date: Nov. 13, 2008

(87) PCT Pub. No.: WO2005/069570
PCT Pub. Date: Jul. 28, 2005

(65) Prior Publication Data
US 2009/0059830 A1    Mar. 5, 2009

(30) Foreign Application Priority Data

Jan. 9, 2004  (EP) .................................... 04100061
Jan. 23, 2004  (GB) ................................. 0401475.9

(51) Int. Cl.
*H04H 20/71* (2008.01)
(52) U.S. Cl. ........ 370/312; 375/329; 375/281; 375/231; 375/235
(58) Field of Classification Search .................. 370/312; 375/329, 279, 280, 260, 267, 264, 295
See application file for complete search history.

(56) References Cited

U.S. PATENT DOCUMENTS

| | | | |
|---|---|---|---|
| 5,066,957 A | | 11/1991 | Mizuno et al. |
| 6,741,658 B1 * | | 5/2004 | Ionescu .......................... 375/267 |
| 2003/0039321 A1 | | 2/2003 | Lee et al. |
| 2004/0264585 A1 * | | 12/2004 | Borran et al. .................. 375/260 |
| 2005/0074068 A1 * | | 4/2005 | Borran et al. .................. 375/264 |
| 2005/0147180 A1 * | | 7/2005 | Ionescu .......................... 375/295 |

OTHER PUBLICATIONS

By M. B. Pursley et al. Entitled: "Convolutionally Encoded Phase-Shift-Key Modulation for Multimedia Multicast Transmission in Mobile Wireless Networks" MILCOM 97 Proceedings Monterey, CA, Nov. 2-5, 1997; USA Department of Electrical and Computer Engineering, Clemson University; 303 Engineering Innovation Building, Clemson, SC 29634; pp. 978-982.
Philips; Entitled: Other Options for Reusing R99 Paging Occasions Also for MBMS Paging (or: How to Provided Paging Indicateors for MBMS Purposes?) Agenda Item: 10.2.1; TSG-RAN Working Group 2 (Radio layer 2 and Radio layer 3), Sophia-Antipolis France; Jan. 12-16,2004; pp. 1-9.
Qualcomm: Entitled: "MBMS PCIH"; 3GPP TSG-RAN WG2 Meeting #40; Jan. 12-16, 2004; Sophia Antipolis France. pp. 1-5.

* cited by examiner

*Primary Examiner* — David Q Nguyen
(74) *Attorney, Agent, or Firm* — Edward W. Goodman

(57) ABSTRACT

First and second data is transmitted simultaneously by modulating a first set of signal constellation points, corresponding to the first data, with second data thereby creating a second set of constellation points. The second set of constellation points comprises two subsets corresponding to two values of the first data. The constellation points are selected such that the minimum distance between the first and second subsets is not less than the minimum distance between the constellation points of the first set of constellation points.

17 Claims, 3 Drawing Sheets

| Constellation point in Figure 2 | Rel-99 paging indication | MBMS paging indication |
|---|---|---|
| A | ON | OFF |
| B | OFF | OFF |
| C | ON | ON |
| D | OFF | ON |

FIG.6

| Constellation point in Figure 3 | Rel-99 paging indication | MBMS paging indication |
|---|---|---|
| E | ON | OFF |
| F | OFF | OFF |
| G | ON | ON |
| H | OFF | ON |

FIG.7

| Constellation point in Fig. 4 | Rel-99 paging indication | MBMS paging indication 1 | MBMS paging indication 2 |
|---|---|---|---|
| A | ON | OFF | OFF |
| B | OFF | OFF | OFF |
| C | ON | ON | ON |
| D | OFF | ON | ON |
| E | ON | OFF | ON |
| F | OFF | OFF | ON |
| G | ON | ON | OFF |
| H | OFF | ON | OFF |

FIG.8

METHOD OF SIGNALLING, A COMMUNICATION SYSTEM AND A COMMUNICATION EQUIPMENT

The invention relates to a method of signalling between communication equipments in a communication system, to a communication equipment and to a communication system. The invention has particular application to upgrading a communication system to provide new services to new communication equipments while simultaneously providing existing services to existing communication equipments.

The invention will be described in relation to UMTS (Universal Mobile Telecommunication System), although the invention is not limited to application in that system. The invention may be used, for example, in a communication system requiring simultaneous paging for different uncoordinated services, especially in cellular systems such as UMTS and CDMA 2000.

When the new Multimedia Broadcast/Multicast Service (MBMS) is introduced in UMTS, it will be necessary to send paging messages to indicate the start of MBMS sessions as well as the currently-standardised dedicated paging messages. Such a network providing MBMS will be referred to as an MBMS-enabled network.

In a current UMTS network, Release 99 (Rel-99), paging indicators are transmitted on a Paging Indicator Channel (PICH) using one channelisation code. The Rel-99 PICH uses one Spreading Factor 256 code with a type of BPSK (binary phase shift keying) to indicate paging: after a QPSK (quaternary phase shift keying) modulation mapper, the bits are set to −1 if the UE (User Equipment) is to wake up, and otherwise the bits are set to +1. This results in the constellation diagram shown in FIG. 1 comprising constellation points A and B at, respectively, coordinates $(-x_1,-y_1)$ and $(x_2, y_2)$. In this example, $x_1=x_2=y_1=y_2=1$.

For MBMS, additional paging indications are required. Any solution for providing these additional paging indicators must be fully compatible with UMTS Rel-99 UE receivers. A Rel-99 UE must not be affected by any MBMS paging indications received from an MBMS-enabled network. This requirement includes no degradation of performance for a Rel-99 UE receiving the PICH, at least in the case of perfect knowledge at the UE of the impulse response of the radio channel through which the paging indicators are transmitted.

One possible solution is to use an additional channelisation code for the MBMS-specific PICH. However, it would be desirable to avoid the use of an additional channelisation code for MBMS-specific paging as this would exacerbate the pre-existing downlink code shortage in UMTS.

An object of the invention is to enable new services to be provided in a communication system in a manner compatible with earlier versions of the system.

According to a first aspect of the invention there is provided a method of signalling between communication equipments in a communication system adapted to transmit first data from a first communication equipment to a second communication equipment by modulating a carrier signal according to a first set of constellation points having a first minimum distance between constellation points corresponding to first and second values of the first data, the method comprising:
transmitting first and second data simultaneously by modulating the carrier signal according to a second set of constellation points arranged in a constellation plane, wherein the second set of constellation points is arranged such that:
a first subset of the second set of constellation points located in a first part of the constellation plane correspond to a first value of the first data;
a second subset of the second set of constellation points located in a second part of the constellation plane correspond to a second value of the first data;
wherein each of the first and second subsets comprises constellation points corresponding to at least first and second values of the second data; and
wherein the minimum distance between the constellation points of the first subset and the constellation points of the second subset is not less than the first minimum distance.

Using the present invention, the first data may be the Rel-99 paging indicator and the second data may be a MBMS paging indicator. In this way a MBMS paging indicator can be coded onto the Rel-99 PICH by using additional constellation points. This avoids the need for another channelisation code and can be power-efficient. The first and second subsets of constellation points may represent respectively the binary values of the Rel-99 PICH, and by selecting the constellation points of the subsets such that the minimum distance between the subsets is not less than the minimum distance of the Rel-99 PICH constellation, or preferably such that the distance from the subsets to the decision line of the first constellation is not less than the minimum distance of the Rel-99 PICH constellation, a Rel-99 UE may receive the Rel-99 PICH with no degradation in performance.

The first and second subsets of the second set of constellation points may each comprise, for example, two or four constellation points.

In a first embodiment the second set of constellation points includes the first set of constellation points. For example, the second set of constellation points may be derived from the first set of constellation points by adding points having an amplitude greater than the first set of constellation points, to ensure that the minimum distance is not decreased thereby maintaining the performance for demodulating the first data. This embodiment has the advantages that the performance for the first data improves due to the increased minimum distance for the additional points and that the transmit power is not increased for one of the two values of the second data (which can be useful if, for example, the MBMS paging indicators are not set very often), but does require an amplitude reference and an increase in peak amplitude, typically double if the performance of the second data is required to be at least as good as the performance for the first data prior to addition of the second data.

In a second embodiment the second set of constellation points excludes the first set of constellation points, and so is used instead of the first set of constellation points. For example, the second set of constellation points may be derived by modulating the phase of the first set of constellation points while also modulating the amplitude as required to ensure that the minimum distance is not decreased thereby maintaining the performance for demodulating the first data. This embodiment has the advantage that the increase in peak amplitude can be lower and an amplitude reference is not required, but has the disadvantage that there may be a small degradation in performance for Rel-99 UEs if the Rel-99 UEs do not have a reliable phase reference for the received signals.

In a further embodiment the second set of constellation points is a combination of the above two embodiments, with switching between the two forms according to a predetermined criterion.

In a further embodiment in which each subset comprises four constellation points, each subset of four constellation points comprises first and second pairs of constellation points, wherein the first and second pairs correspond respectively to first and second values of third data. For example, the second set of constellation points may be a combination of the constellation points of the first and second embodiments described above, with the switching between the two forms of the second set of constellation points used to convey third data. This embodiment has the advantage of conveying more data.

According to a second aspect of the invention there is provided a communication equipment for transmitting first and second data simultaneously in a communication system adapted to communicate the first data by modulating a carrier signal according to a first set of constellation points having a first minimum distance between constellation points corresponding to first and second values of the first data, the communication equipment comprising:

modulation means adapted to modulate the carrier signal according to a second set of constellation points arranged in a constellation plane, wherein the second set of constellation points is arranged such that:

a first subset of the second set of constellation points located in a first part of the constellation plane correspond to a first value of the first data;

a second subset of the second set of constellation points located in a second part of the constellation plane correspond to a second value of the first data;

wherein each of the first and second subsets comprises constellation points corresponding to at least first and second values of the second data; and wherein the minimum distance between the constellation points of the first subset and the constellation points of the second subset is not less than the first minimum distance; and transmitter means for transmitting the modulated carrier signal.

According to a third aspect of the invention there is provided a communication system comprising a first communication equipment in accordance with the second aspect of the invention, a second communication equipment having first receiving means for receiving the modulated carrier signal and first demodulation means adapted to derive only the first data, and a third communication equipment having second receiving means for receiving the modulated carrier signal and first demodulation means adapted to derive at least the second data.

The invention will now be described, by way of example only, with reference to the accompanying drawings wherein;

FIG. 6 is table of example data values for the constellation points of FIG. 2;

FIG. 7 is table of example data values for the constellation points of FIG. 3; and FIG. 8 is table of example data values for the constellation points of FIG. 4.

Figure 2:
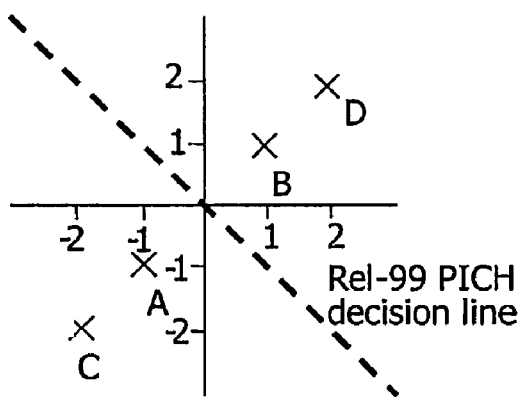
FIG. 2 illustrates a PICH constellation when simple on/off keying is used for the MBMS-specific PICH.

In a first embodiment, if on/off keying is used, the PICH constellation diagram is as shown in FIG. 2. In FIG. 2, positions A and B are the normal Rel-99 PICH constellation points, representing ON and OFF respectively. These continue to be used when the MBMS-specific indication is OFF. When the MBMS-specific indication is ON, the corresponding PICH bits are transmitted with higher energy, so that constellation points C and D are used. The meanings of the 4 constellation points are indicated in FIG. 6.

Note that such a solution is entirely compatible with Rel-99 UEs using the Rel-99 PICH. In fact, the Rel-99 dedicated paging indications would become more reliable if MBMS paging indications were also being used in this way with an MBMS-enabled network because the minimum distance for the Rel-99 paging indication is increased for constellation points C and D of the MBMS paging indications.

The coordinates of points A, B, C and D are in general, respectively, $(x_1, y_1)$, $(x_2, y_2)$, $(x_3, y_3)$, $(x_4, y_4)$. The minimum distance of A and B is maintained if at least $x_3 > x_1$, $x_4 > x_2$, $y_3 > y_1$ and $y_4 > y_2$. More precisely, the requirement that the minimum distance of A and B is maintained may be expressed as C lying either on a first line given by the equation $$y = \frac{(x_2 - x_1)}{(y_1 - y_2)}(x - x_1) + y_1$$

or on the opposite side of the said first line from the point $(x_2, y_2)$, and D lying either on a second line given by the equation $$y = \frac{(x_2 - x_1)}{(y_1 - y_2)}(x - x_2) + y_2$$

or on the opposite side of the said second line from the point $(x_1, y_1)$. In the example embodiment of FIG. 2, $x_1 = x_2 = y_1 = y_2$ and $x_3 = x_4 = y_3 = y_4$ although such constraints are not essential. Furthermore in FIG. 2, $x_1 = 1$ and $x_3 = 2$, but other values may be used. The units of the x and y values in FIGS. 1 to 4 are arbitrary.

This first embodiment requires the MBMS UE to establish an amplitude reference in order to determine the MBMS paging indication; such a reference is required for any scheme using ON-OFF keying.

There are a number of possible ways in which an amplitude reference can be provided:

use the 12 currently-unused bits of the PICH as the amplitude reference, as these bits would only carry MBMS-related information and could therefore use single-level BPSK or QPSK;

designate certain PICH bits as an amplitude reference; such bits would not be used for MBMS and would therefore take only constellation positions A or B;

signal a specific offset relative to a pilot channel.

A second, alternative embodiment is attractive if on/off keying is not used for the MBMS-specific PICH. We then make use of the fact that one phase of the Rel-99 PICH is not used, i.e. it is effectively antipodal keying (a form of BPSK) not QPSK. We therefore use the additional phase to code the MBMS-specific paging together with the Rel-99 paging without needing another channelisation code or increasing the peak power as much as in the first embodiment.

Figure 3:
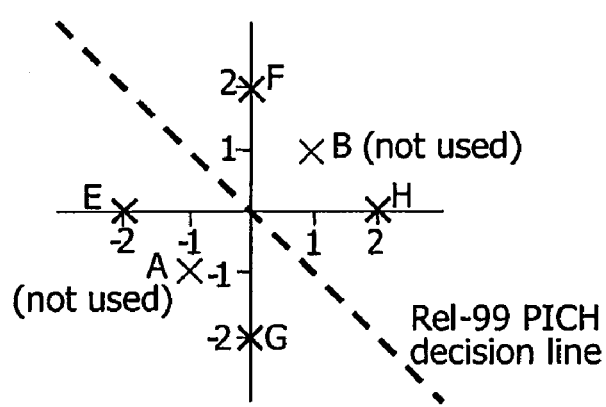
FIG. 3 illustrates a QPSK PICH constellation when MBMS-specific PICH is coded together with a dedicated PICH (i.e. Rel-99 PICH)

The constellation is then as shown by points E, F, G and H in FIG. 3. Note that points A and B, the Rel-99 PICH positions, are not used. Instead, points E or G are used to indicate ON for the dedicated PICH, while points F or H are used to indicate OFF for the dedicated PICH. Note that this can maintain at least the same distance between ON and OFF for the dedicated paging indicators, and thus have no impact on a Rel-99 UE receiver which knows nothing about MBMS. This embodiment also has the attraction of not needing an amplitude reference.

The meanings of the 4 constellation points in this case are indicated in FIG. 7. The coordinates of points E, F, G and H are in general, respectively, $(-x_5, 0)$, $(0, y_6)$, $(0, -y_5)$, and $(x_6, 0)$ where $x_5$, $x_6$, $y_5$ and $y_6$ are positive numbers. The requirement that the same minimum distance of A and B is maintained may be expressed as $x_5 \geq 2x_1$, $x_6 \geq 2x_2$, $y_5 \geq 2y_1$ and $y_6 \geq 2y_2$. In the example of FIG. 3 $x_1 = x_2 = y_1 = y_2$ and $x_5 = x_6 = y_5 = y_6$ although such constraints are not essential. Furthermore in FIG. 3, $x_1 = 1$ and $x_5 = 2$, but other values may be used.

A third embodiment, combining the solutions of the first and second embodiments, allows for example for two different MBMS services to share the same paging occasion. This could be used to increase the probability that the MBMS paging occasions could coincide with the dedicated paging occasions for a UE, thus reducing the amount of time for which a UE would have to wake up its receiver.

Figure 4:
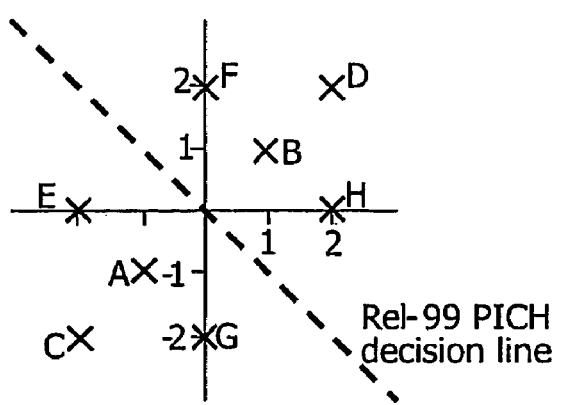
FIG. 4 illustrates a QPSK PICH constellation for an alternative way of coding an MBMS-specific PICH together with dedicated PICH.

The constellation for the third embodiment is shown in FIG. 4. In FIG. 4, the original Rel-99 constellation points A and B are again used when MBMS paging is OFF. The points A, B, C, D, E, F, G, H are used to indicate different combinations paging indicators for 2 MBMS services as indicated in FIG. 8. This scheme also requires an amplitude reference. Similar methods for providing an amplitude reference could be used as described for the first embodiment.

In a further aspect of the invention, the base station may select different constellations or signalling schemes depending on the available services. For example, if the frequency of occurrence of MBMS paging indicators is low, it may be desirable to use antipodal signalling such as that shown in FIG. 2, with the aim of minimising the average transmission power at the expense of a slightly higher peak transmission power. Conversely, if the frequency of occurrence of MBMS paging indicators is high, it may be preferable to minimise the peak transmission power by using a constellation such as that shown in FIG. 3. The switching between constellations may be at the discretion of the base station, and may further be signalled explicitly or implicitly to the mobile stations. Criteria for switching between constellations may include for example the number of paging indicators transmitted in a predetermined recent time period, the number of active MBMS sessions, or the number of active MBMS users.

Figure 5:
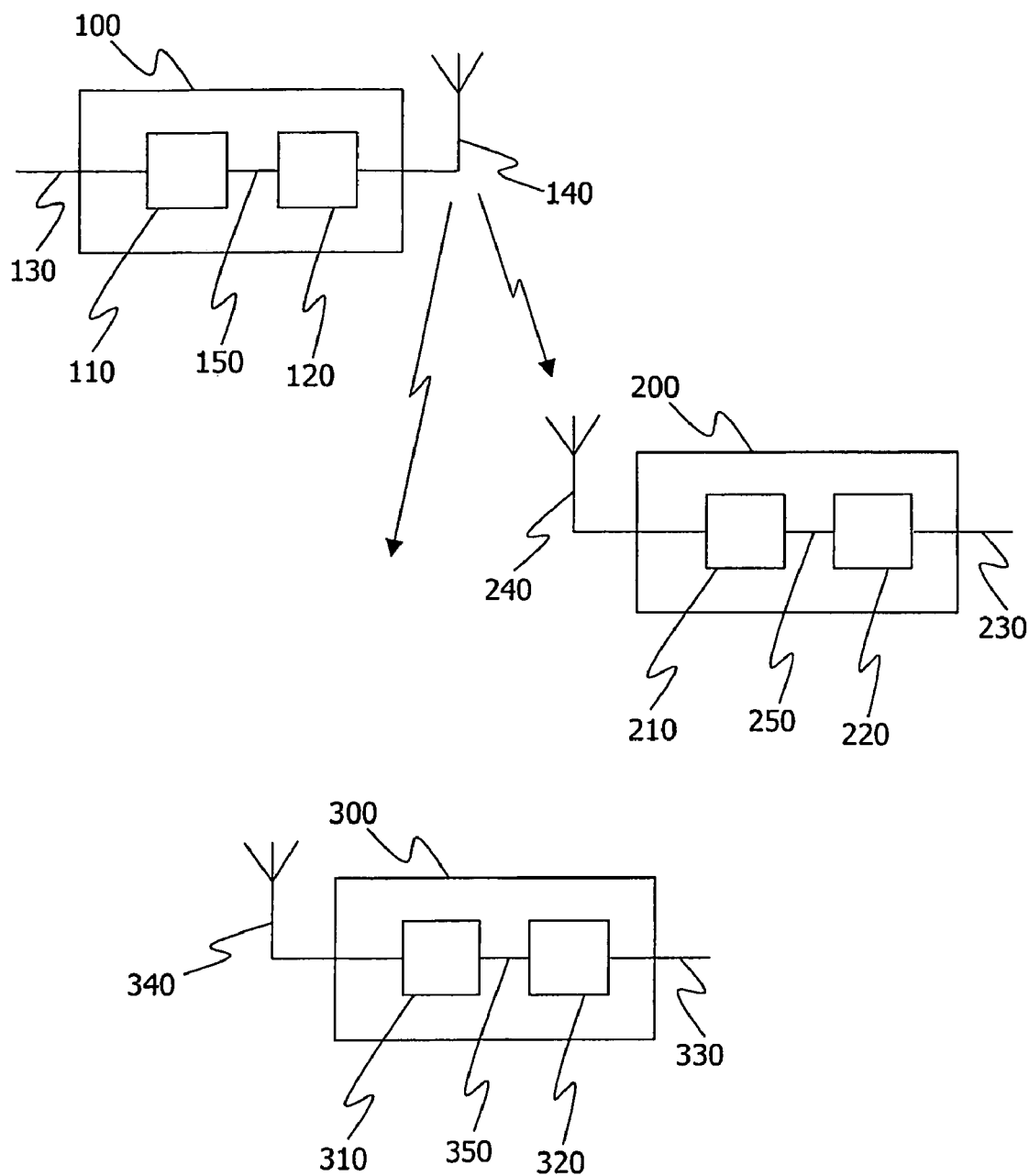
FIG. 5 is a block schematic diagram of a communication system.

FIG. 5 is a block schematic diagram of a communication system in accordance with the invention. There is a first communication equipment 100, for example a base station, and second and third communication equipments, respectively 200 and 300, for example mobile stations. The second equipment 200 is a Rel-99 UE, and the third equipment 300 is a UE in accordance with the invention.

The first equipment 100 comprises an input 130 for receiving first and second data. The input 130 is coupled to a modulation means 110 which is adapted to modulate a carrier signal with the first and second data according to a set of constellation points arranged in a constellation plane. The constellation points are in accordance with any of the embodiments described above. An output 150 of the modulation means 110 is coupled to an input of a transmitter means 120 for transmission of the modulated carrier signal via an antenna 140.

Figure 1:
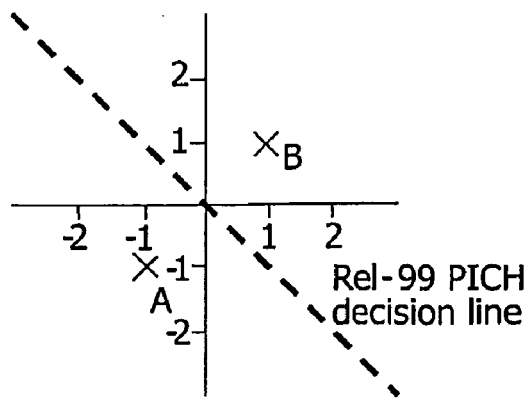
FIG. 1 illustrates a Rel-99 PICH constellation.

The second equipment 200 comprises an antenna 240 coupled to an input of a receiver means 210 for receiving the modulated carrier signal. An output of the receiver means 210 is coupled to an input 250 of a demodulation means 220 adapted to demodulate the received carrier signal to derive the first data only and to deliver the first data on an output 230. The demodulation means 220 is adapted to derive the first data by determining whether the modulation of the received carrier signal lies in a first half of a constellation plane, corresponding to a first value of the first data, or a second half of a constellation plane, corresponding to a second value of the first data. In one embodiment, as illustrated in FIG. 1, the first and second halves of the constellation plane are defined by a line $y = -x$. Demodulation methods for determining the location of a signal in a constellation plane are well known to persons skilled in the art.

The third equipment 300 comprises an antenna 340 coupled to an input of a receiver means 310 for receiving the modulated carrier signal. An output of the receiver means 310 is coupled to an input 350 of a demodulation means 320 adapted to demodulate the received carrier signal to derive the second data, and optionally the first data, and to deliver the second data, and optionally the first data, on an output 330. The demodulation means 320 is adapted to derive the second data by determining the amplitude and/or phase of the received carrier signal, according to the constellation points employed by the first equipment 100.

Using the constellation of FIG. 2, a first amplitude, of constellation points A and B, corresponds to a first value of the second data, and a second amplitude, of constellation points C and D, corresponds to a second value of the second data.

Using the constellation points of FIG. 3, the phases of constellation points E and F correspond to a first value of the second data and the phases of constellation points G and H correspond to a second value of the second data.

Using the constellation points of FIG. 4, the demodulation means 320 is adapted to derive the second data from either the constellation points A, B, C, D or the constellation points E, F, G, H, according to which constellation points are employed by the first equipment 100. Optionally, the first equipment 100 may transmit an indication to the third equipment 300 so that the demodulation means 320 knows a priori which constellation points to expect, whereby improving the reliability of demodulation.

Optionally the demodulation means 320 may additionally be adapted to derive the first data by determining whether the modulation of the received carrier signal lies in a first half of a constellation plane, corresponding to a first value of the first data, or a second half of a constellation plane, corresponding to a second value of the first data, as described above for the second equipment 200.

Therefore, in accordance with the invention, the first equipment 100 is able to simultaneously transmit the first data to the second equipment 200, and the second data to the third equipment 300, and optionally the first data also to the third equipment 300.

In a further aspect of the invention, in the first station the modulation means 110 is adapted to modulate a carrier signal with first, second and third data according to a set of constellation points arranged in a constellation plane as illustrated in FIG. 4 and described above. In this embodiment the demodulation means 320 is adapted to derive the second and third data from the constellation points as indicated in FIG. 8, where the second data is, for example, MBMS paging indicator 1, and the third data is, for example, MBMS paging indicator 2.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of electronic communication and the art of signal design and which may be used instead of or in addition to features already described herein.

The invention claimed is:

1. A method of signalling between communication equipments in a communication system adapted to transmit first data from a first communication equipment to a second communication equipment by modulating a carrier signal according to a first set of constellation points having a first minimum distance between constellation points corresponding to first and second values of the first data, the method comprising:
transmitting first and second data simultaneously by modulating the carrier signal according to a second set of constellation points arranged in a constellation plane, wherein the second set of constellation points is arranged such that:
a first subset of the second set of constellation points located in a first part of the constellation plane correspond to a first value of the first data;
a second subset of the second set of constellation points located in a second part of the constellation plane correspond to a second value of the first data;
wherein each of the first and second subsets comprises constellation points corresponding to at least first and second values of the second data; and
wherein the minimum distance between the constellation points of the first subset and the constellation points of the second subset is not less than the first minimum distance.

2. A method as claimed in claim 1, wherein the minimum distance between the constellation points of the second set of constellation points and the perpendicular bisector of the straight line joining the closest two points corresponding respectively to first and second values of the first data in the first set of constellation points is not less than half the first minimum distance.

3. A method as claimed in claim 1, wherein each of the first and second subsets comprises two constellation points.

4. A method as claimed in claim 1, wherein the second set of constellation points includes the first set of constellation points.

5. A method as claimed in claim 4, wherein the first set of constellation points comprises points $(-x1a, -y1a)$ and $(x2a, y2a)$, the first subset of the second set of constellation points comprises points $(-x1a, -y1a)$ and $(-x3, -y3)$, the second subset of the second set of constellation points comprises points $(x2a, y2a)$ and $(x4, y4)$ and, where $x3>x1a$, $x4>x2a$, $y3>y1a$ and $y4>y2a$, where $x1a, x2a, x3, x4, y1a, y2a, y3, y4$ are positive numbers.

6. A method as claimed in claim 5, wherein substantially $x1a=x2a=y1a=y2a$ and $x3=x4=y3=y4=2x1$.

7. A method as claimed in claim 1, wherein the first set of constellation points comprises points $(-x1b, -y1b)$ and $(x2b, y2b)$, the first subset of the second set of constellation points comprises points $(-x5, 0)$ and $(0, -y5)$, the second subset of the second set of constellation points comprises points $(0, y6)$ and $(x6, 0)$ and $x5 \geq 2x1b$, $x6 \geq 2x2b$, $y5 \geq 2y1b$ and $y6 \geq 2y2b$, where $x1b, x2b, x5, x6, y1b, y2b, y5, y6$ are positive numbers.

8. A method as claimed in claim 7, wherein substantially $x1b=x2b=y1b=y2b$ and $x5=x6=y5=y6=2x1$.

9. A method as claimed in claim 1, wherein each of the first and second subsets comprise four constellation points.

10. A method as claimed in claim 9, wherein in each subset of four constellation points, a first pair of constellation points correspond to respectively the first and second values of the second data, and a second pair of constellation points correspond to respectively the first and second values of the second data, and further comprising switching between transmission of the first and second pair according to a predetermined criterion.

11. A method as claimed in claim 9, further comprising transmitting third data simultaneously to the first and second data, wherein, in each subset of four constellation points, first and second pairs of constellation points correspond respectively to first and second values of the third data.

12. A method as claimed in claim 10, wherein in the first subset of four constellation points the first pair of constellation points is $(-x1, -y1)$ and $(-x3, -y3)$, and the second pair of constellation points is $(-x5, 0)$ and $(0, -y5)$, and in the second subset of four constellation points the first pair of constellation points is $(x2, y2)$, and $(x4, y4)$, and the second pair of constellation points is $(0, y6)$ and $(x6, 0)$, where $x3>x1$, $x4>x2$, $x5 \geq 2x1$, $x6 \geq 2x2$, $y3>y1$, $y4>y2$, $y5 \geq 2y1$ and $y6 \geq 2y2$, where $x1, x2, x3, x4, x5, x6, y1, y2, y3, y4, y5,$ and $y6$ are positive numbers.

13. A method as claimed in claim 12, wherein substantially $x1=x2=y1=y2$ and $x3=x4=x5=x6=y3=y4=y5=y6=2x1$.

14. A method as claimed in claim 1, comprising receiving the modulated carrier signal at first and second receiving equipments and at the first receiving equipment demodulating only the first data, and at the second receiving equipment demodulating at least the second data.

15. A communication equipment for transmitting first and second data simultaneously in a communication system adapted to communicate the first data by modulating a carrier signal according to a first set of constellation points having a first minimum distance between constellation points corresponding to first and second values of the first data, the communications equipment comprising:
modulation means adapted to modulate the carrier signal according to a second set of constellation points arranged in a constellation plane, wherein the second set of constellation points is arranged such that:
a first subset of the second set of constellation points located in a first part of the constellation plane correspond to a first value of the first data;
a second subset of the second set of constellation points located in a second part of the constellation plane correspond to a second value of the first data;
wherein each of the first and second subsets comprises constellation points corresponding to at least first and second values of the second data; and
wherein the minimum distance between the constellation points of the first subset and the constellation points of the second subset is not less than the first minimum distance; and
transmitter means for transmitting the modulated carrier signal.

16. A communication equipment as clamed in claim 15, wherein the modulation means is adapted to modulate the carrier.

17. A communication system comprising a first communication equipment as claimed in claim 15,
a second communication equipment having first receiving means for receiving the modulated carrier signal and first demodulation means adapted to derive only the first data and
a third communication equipment having second receiving means for receiving the modulated carrier signal and first demodulation means adapted to derive at least the second data.

* * * * *